Jan. 8, 1963   A. C. OAKES ETAL   3,072,308
GLASS SNAPPING APPARATUS
Filed Feb. 15, 1960   3 Sheets-Sheet 1

FIG. 1

INVENTORS
ALFRED C. OAKES
WAYNE W. OAKES and
BY CHARLES HATFIELD

Oscar H. Spencer
ATTORNEY

INVENTORS
ALFRED C. OAKES
WAYNE W. OAKES and
BY CHARLES HATFIELD

Oscar L. Spencer
ATTORNEY 3,072,308
GLASS SNAPPING APPARATUS
Alfred C. Oakes, Wayne W. Oakes, and Charles Hatfield, Mount Vernon, Ohio, assignors to Pittsburgh Plate Glass Company, a corporation of Pennsylvania
Filed Feb. 15, 1960, Ser. No. 8,550
15 Claims. (Cl. 225—96.5)

This invention relates to a glass snapping apparatus and more specifically relates to an apparatus for running cuts in sequence along a number of parallel score lines which are parallel to the leading edge of a moving glass sheet.

In the manufacture of glass sheets a continuous moving ribbon of glass is formed. This ribbon of glass is cut along parallel lines to produce capped glass sheets. The ribbon usually has bulbous edges so that each of the capped sheets has a pair of bulbous edges.

In the cutting of the capped sheet to sheets of smaller size various apparatuses have been developed to score the glass sheet along parallel lines by cutter wheels. An apparatus for providing these parallel score lines on a moving glass sheet, such as a capped glass sheet, with the score lines parallel to the direction of travel of the glass sheet and normal to the leading edge of the glass sheet, is disclosed and claimed in our copending patent application entitled "Glass Cutting Apparatus," Serial No. 8,549, filed by us on February 15, 1960. By any one of conventional apparatuses the cut is run along the score line closest to each of the bulbous edges, while the scored glass sheet is moving in the direction parallel to the score lines, to produce a glass sheet having parallel score lines and newly formed cut edges which are parallel to these score lines. In order to obtain from this sheet the number of smaller glass sheets indicated by the score lines, it is necessary to run the cuts along each of the score lines.

Heretofore, it has been conventional to change the direction of the glass sheet so that it moves laterally with respect to its original movement. When thus moving the glass sheet was passed over a conveyor roll that is higher than the other conveyor rolls whereby a force is applied seriatim along each of the score lines. This runs the cuts along these score lines which are now normal to the path of travel provided by the lateral motion of the glass sheet.

It is an object of the present invention to provide an apparatus for the application of a snapping force on the moving glass sheet ahead of a score line at the moment that the sheet is being supported directly below the first score line behind the leading edge of the sheet.

It is a further object of this invention to provide an apparatus for snapping a glass sheet along parallel score lines seriatim by applying a force at times that is determined by a program of snapping that relates to the distances between the various parallel score lines.

It is still a further object of the present invention to provide an apparatus for snapping a glass sheet along parallel score lines seriatim in accordance with the distances between the score lines, but the apparatus has a construction which permits rapid change between programs of force applications based upon differences in distances between the score lines of sheets scored to produce sheets of different dimensions.

It is another object of the present invention to provide an apparatus for applying snapping forces in a predetermined program to run cuts along parallel score lines of a moving glass sheet where the glass initiates the program.

These and other objects of this invention will be apparent to one skilled in the art from the description which follows of a preferred embodiment of the apparatus taken along with the drawings in which similar parts are generally designated by the same numeral and in which.

Figure 2:
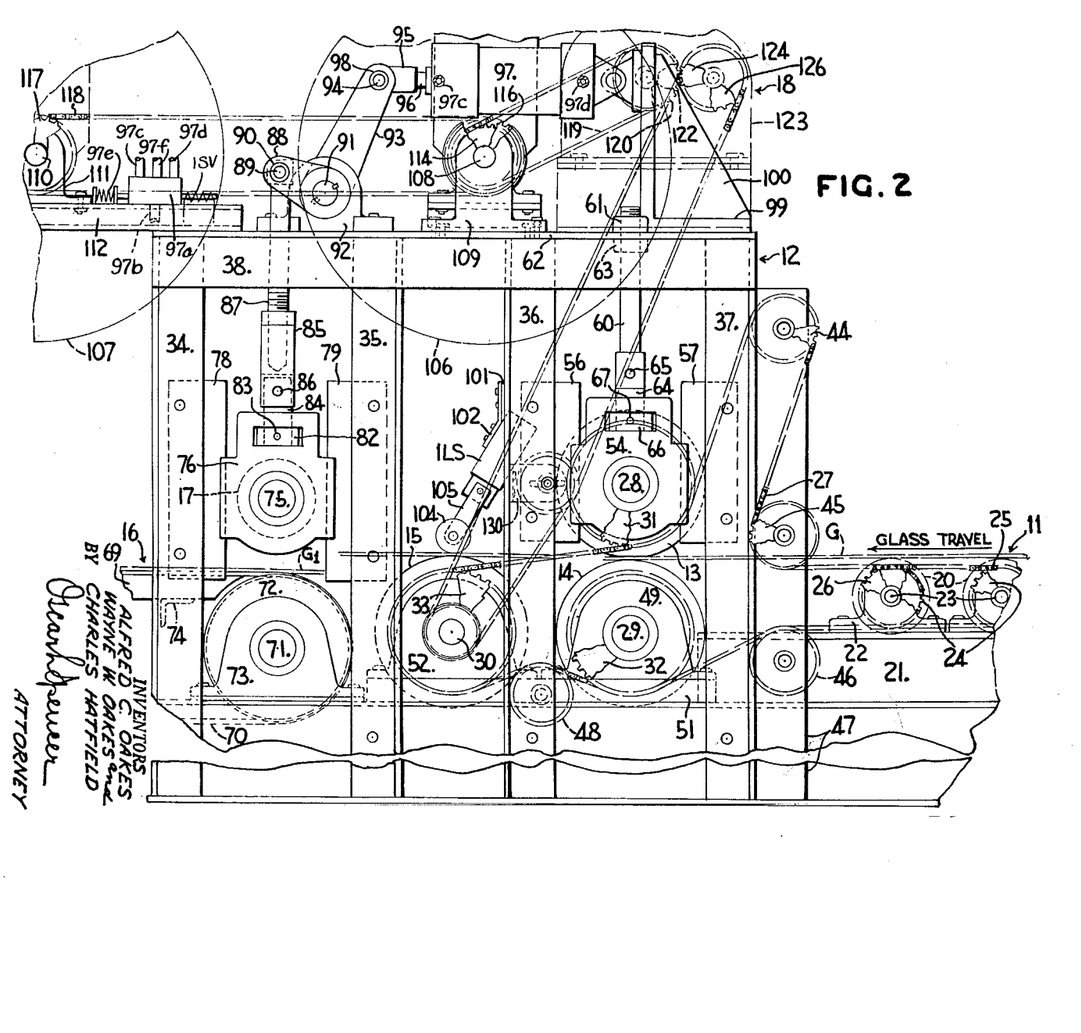
FIG. 2 is a rear elevation of the preferred embodiment.

The apparatus of the preferred embodiment, as seen in FIG. 2, has a feeding conveyor generally indicated at 11. A glass sheet G is placed on conveyor 11 so that the parallel score lines, which are parallel to the leading edge of sheet G, are normal to the horizontal path of travel afforded by conveyor 11. When sheet G is provided with parallel score lines, such as by the apparatus of our copending application mentioned above, the direction of travel, which is provided by the conveyor of that apparatus, is changed by a conventional corner table conveyor, which then moves the glass sheet laterally of its original path onto conveyor 11.

The apparatus further includes a support structure generally indicated at 12, a pair of rolls 13 and 14 between which sheet G is fed by conveyor 11, a roll 15 onto which sheet G passes from rolls 13 and 14, a receiving conveyor generally indicated at 16 which receives the smaller glass sheets $G_1$ as they are produced by each snapping operation, a roll 17 mounted on supporting structure 12 for vertical movement, and a mechanism, of which the mechanical components are generally indicated at 18, for moving roll 17 downwardly and then upwardly as a sequence of operation which is repeated in a programmed manner.

The horizontal plane of travel of the bottom surface of sheet G afforded by conveyor 11 and rolls 14 and 15 is above, e.g., by about 1 inch, the horizontal plane of the bottom surface of the smaller glass sheets $G_1$ as supported by receiving conveyor 16. Thus the top of rolls 14 and 15 is above that of conveyor 16. With this construction receiving conveyor 16 does not support glass sheet G to be snapped. When roll 17 is lowered to run a cut along a score line, the newly formed sheet $G_1$ from the snapping operation falls the small distance onto receiving conveyor 16. In other words, in the construction of the apparatus the leading portion of the glass sheet to be run along a score line is unsupported so that roll 17, when lowered, provides a downward force on that portion of sheet G that causes the glass sheet to run the cut along the score line which is directly above roll 15 which thus supports sheet G at the score line. Rolls 13 and 14 hold the remaining portion of sheet G in the path of travel.

The feeding conveyor 11 has conveyor rolls 20 mounted on transversely spaced horizontal channel irons 21 of supporting structure 12 by pairs of bearings 22 in which shafts 23 on rolls 20 are journaled. A sprocket 24 is keyed on one end of each of shafts 23. The sprockets 24 are driven by a chain 25 by a sprocket (not shown) driven by a motor source (not shown). The shaft 23 closest to rolls 13 and 14 also has a sprocket 26 keyed on that end. The sprocket 26 drives a chain 27.

The rolls 13, 14 and 15 preferably have larger outside diameters than rolls 20. Whereas in the preferred embodiment conveyor rolls 20 are preferably made of resilient rings, such as rubber rings, mounted on shafts 23, rolls 13, 14 and 15 preferably have a cylindrical surface of uniform diameter for a length greater than the width of the glass sheets G to be fed by conveyor 11. The cylindrical rolls 13, 14 and 15 have their shafts 28, 29 and 30, respectively, covered with a resilient material, such as felt or rubber.

Sprockets 31, 32 and 33 are keyed on shafts 28, 29 and 30, respectively, and are driven by chain 27. The supporting structure includes uprights 34, 35, 36 and 37, on which is mounted an angle iron 38, and uprights 39, 40, 41 and 42, on which is mounted a horizontal angle iron 43. Idler sprockets 44, 45 and 46 are journaled by bearings (not shown) on a vertical support 47 connected to upright 37. An idler sprocket 48 is journaled on upright 36 by a bearing (not shown). The sprockets 44 through 46 and 48 engage chain 27.

The shaft 29 is journaled in bearings 49 and 50 mounted on plates 51 of supporting structure 12. The shaft 30 is journaled in bearings 52 and 53 mounted on plates 51. The shaft 28 is journaled in take-up bearings 54 and 55, each having a housing having grooves in its vertical sides. The grooves of bearing 54 engage guide plates 56 and 57 and those of bearing 55 engage plates 58 and 59. The plates 56, 57, 58 and 59 are mounted on uprights 36, 37, 39 and 40, respectively. of supporting structure 12.

A rod 60 threaded at one end and bifurcated at the other is supported vertically by a nut 61, on a plate 62 mounted on angle iron 38 and by a nut 63 welded to the underface of plate 62. The rod 60 extends through an opening in plate 62. The bifurcated end of rod 60 is connected to a yoke arm 64 by a bolt 65. The arm 64 extends through a vertical aperture in the top of the housing of bearing 54. A take-up bearing disc 66 is pivotally connected to the bottom end of yoke arm 64 by a pin 67. The disc 66 is in a horizontal opening in the housing of bearing 54. The horizontal opening communicates with the vertical opening through which yoke arm 64 passes. The vertical adjustment of bearing 54 is provided by removing pin 67 for rotation of yoke arm 64 and rod 60. The nut 61 is away from plate 62 when lowering rod 60 until the proper position of rod 60 is provided. When rod 60 is raised, nut 61 is then brought down to abut plate 62. The bearing 55 is similarly supported by a rod 60, a nut 61, a nut 63 (which is welded to plate 68 mounted on angle iron 43), a yoke arm 64, a bolt 65, a bearing disc 66 and a pin 67. The vertical adjustment of bearings 54 and 55 is provided so that roll 13 is spaced from roll 14 a distance that is preferably slightly less than the thickness of the glass to be snapped along its score lines by this apparatus.

The receiving conveyor 16 has a number of table sections 69, belts 70 supported in their top run on table sections 69, pulleys (not shown) on a drive shaft (not shown) rotated by a motor source (not shown), a tail shaft 71 and pulleys 72 keyed on shaft 71. The belts 70 move around pulleys 72. The shaft 71 is journaled in bearing 73 mounted on supporting structure 12. The end of table sections 69 is supported by a transverse angle iron 74 mounted on uprights 34. The roll 17 has its axis of rotation directly above that of shaft 71.

The roll 17 has a shaft 75 which is journaled at its ends in take-up bearings 76 and 77, each of which has grooves in the vertical sides of its housing. The vertical grooves in bearings 76 engage guide plates 78 and 79 mounted on uprights 34 and 35 and the vertical grooves in bearing 77 engage guide plates 80 and 81 mounted on uprights 41 and 42.

The top portion of the housings of bearings 76 and 77 have communicating vertical and horizontal apertures in the housings of bearings 76 and 77. Bearing discs 82 in the horizontal apertures are connected by pins 83 to yoke arms 84. The top portion of each of yoke arms 84 extends upwardly into a bifurcated portion of a yoke 85 to which arm 84 is connected by a bolt 86. A rod 87 threaded at its bottom end is screwed to the top portion of each of yokes 85. The rods 87 extend upwardly through plates 62 and 68. The top portion of rods 87 is bifurcated to receive a pivot arm 88 and a pin 89. The pins 89 are held in place by washers 90 and cotter pins (not shown). The pivot arms 88 are keyed on a shaft 91 which is journaled at its ends in bearing 92 on plate 62 and a bearing (not shown) on plate 68. With this construction rods 87 support shaft 75 and thus support roll 17 spaced above pulleys 72 and belts 70 of conveyor 16. Vertical movement is provided by movement of shaft 91 about its axis of rotation.

The rotation of shaft 91 is provided by movement of a pivot arm 93 keyed on shaft 91 intermediate its ends. The arm 93 is pivotally connected at its bifurcated end by a pin 94 to a clevis 95 connected to a piston rod 96 of an air cylinder 97. The pin 94 is retained in place by washers 98 and cotter pins (not shown). The air cylinder 97 is pivotally mounted at its other end to a bracket 99 mounted on plate 62 of supporting structure 12. The bracket 99 has a gusset 100.

With piston rod 96 in its retracted position, as shown in FIG. 2, roll 17 is in its raised position above the path of travel of sheet G. When piston rod 96 is extended, roll 17 is lowered to a position where its lowermost portion is below the path of travel of sheet G whereby roll 17 produces a downward force on sheet G when moving to this position.

The operation of air cylinder 97 is controlled by a solenoid-operated, spring-biased, 4-way valve 97a connected by a hose 97b to a pressurized air source (not shown) and connected by hoses 97c and 97d to the two chambers of air cylinder 97. The 4-way valve 97a has a solenoid 1SV (FIGS. 2 and 3) which, when energized, moves the spool of the valve from a first position to a second position. When solenoid 1SV is not energized, valve 97a with its spool by the operation of a spring 97e is in the first position where hose 97b, valve 97a and hose 97c communciates the pressurized air source with the left-hand chamber (as viewed in FIG. 2) of cylinder 97 and the right-hand chamber is in communication with an exhaust hose 97f through hose 97d and valve 97a. This is the normal condition of valve 97a so that the normal position of rod 96 is as shown in FIG. 2. When solenoid 1SV is energized, the right-hand chamber of cylinder 97 communicates through hose 97d, valve 97a and hose 97b with the pressurized air source and the left-hand chamber communicates with exhaust hose 97f through hose 97c and valve 97a so that piston rod is extended to pivot arm 93 about shaft 91 thereby pivoting arms 88 to lower rods 87 so that roll 17 is moved downwardly.

The roll 17, which may be like conveyor rolls 20 or which may be a shaft covered with a continuous cylinder of rubber or other resilient material, is brought downwardly against sheet G at the moment that the first score line in sheet G upstream from roll 17 is above roll 15. The roll 17 is only at its lowermost position for a very brief period of time because solenoid 1SV is deenergized shortly after it is energized, as described below in connection with the electrical circuitry.

A plate 101 is mounted on uprights 36 and 40. The plate 101 supports near its ends brackets 102 and 103 on which are mounted limit switches 1LS and 2LS of the normally open type. The rollers 104 of arms 105 of switches 1LS and 2LS are in the path of travel of glass sheet G in their normal position in which switches 1LS and 2LS are open.

Figure 1:
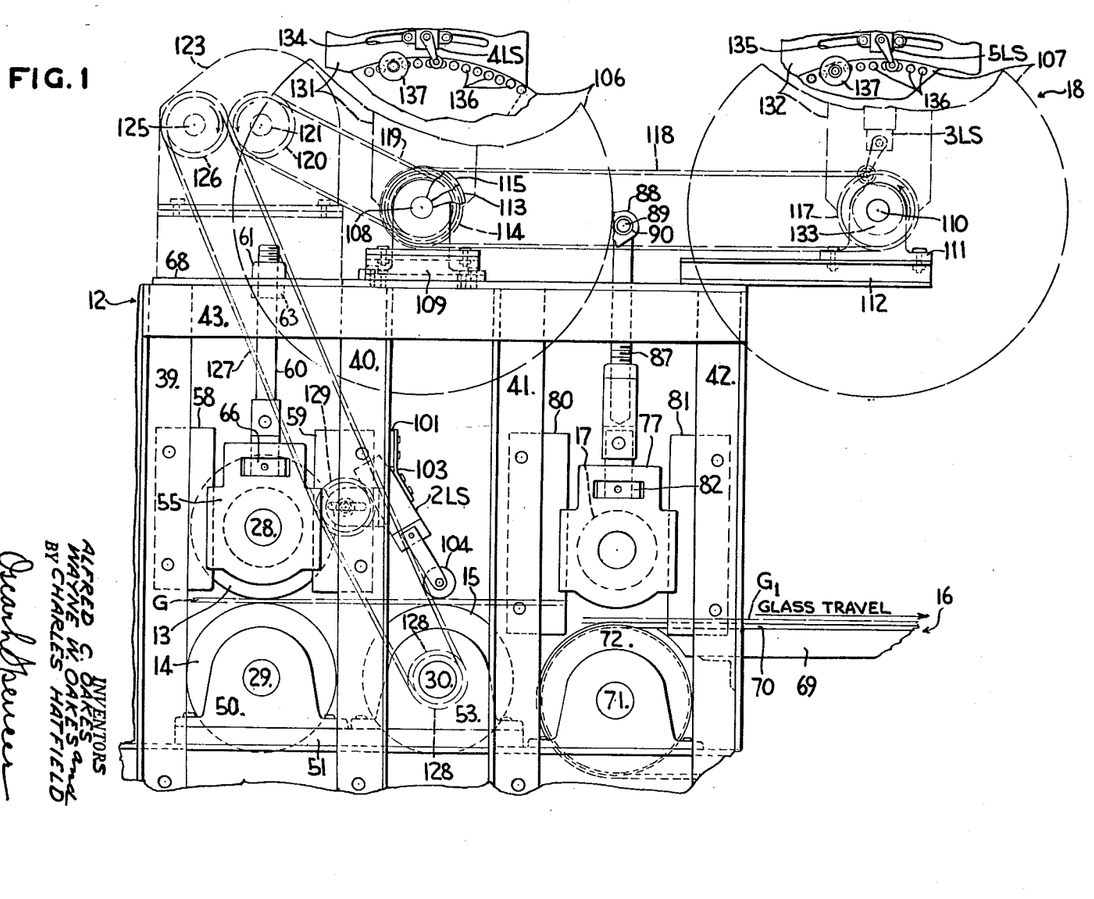
FIG. 1 is a front elevation of the preferred embodiment of the apparatus.

As seen in FIG. 1, the mechanism 18 includes a circular disc or wheel 106 and a wheel 107. The wheel 106 is keyed on a shaft 108 journaled in bearings 109 on plates 62 and 68. The wheel 107 is similarly keyed on a shaft 110 wich is journaled by bearings 11 mounted on channel irons 112. The channel irons 112 are mounted on plates 62 and 68.

An electric clutch 113 having an associated sprocket 114 is mounted by a support bracket (not shown) on plate 68. An electric brake 115 is also mounted by a bracket support (not shown) on plate 68. The shaft 108 extends through electric clutch 113 and its sprocket 114 and through electric brake 115. A sprocket 116 is bolted to wheel 106 and is also keyed on shaft 108. A sprocket 117 is similarly bolted to the rear face of wheel 107 and keyed on shaft 110. A chain 118 connects sprockets 116 and 117.

The sprocket 114 is driven continuously by a chain 119 driven by a sprocket 120 keyed on a shaft 121 on which is also keyed a gear 122 in a gear box 123. The gear 122 meshes with a gear 124 on a shaft 125 which is also journaled in gear box 123. A sprocket 126 is keyed on shaft 125 and is driven by a chain 127 which is driven by a sprocket 128 keyed on shaft 30. Tension on chain 127 is provided by a sprocket 129 journaled on bracket 130 for horizontal adjustment. The bracket is mounted on upright 40. When conveyor 11 is operating continuously, sprocket 114 is rotating continuously.

When a coil 1CC (FIG. 4) of electric clutch 113 is energized, clutch 113 engages shaft 108 so that the latter rotates. The coil 1CC is normally deenergized, as described later. The electric brake 115 has a coil 1BC which is normally energized by the circuit in which it is located so that brake 115 maintains shaft 108 in a fixed location. The deenergization of coil 1BC permits the rotation of shaft 108. When coil 1CC is energized, coil 1BC is deenergized and vice versa, as described later.

A bracket 131 is mounted on plate 68 and a bracket 132 is mounted on channel iron 112. The bracket 132 supports a limit switch 3LS of the normally closed type. The switch 3LS has a roller-containing arm that engages a cam 133 keyed on shaft 110. When wheels 106 and 107 are in their home positions, cam 133 opens switch 3LS. The cam 133 is constructed so that as soon as it is given a slight degree of rotation switch 3LS can close and remain closed until a complete revolution of shaft 110 is made.

The brackets 131 and 132 have arcuate slots 134 and 135, respectively, whose centers of curvature are concentric with wheels 106 and 107. Limit switches 4LS and 5LS of the normally open type are mounted on brackets 131 and 132. The bolts for mounting switches 4LS and 5LS extend through slots 134 and 135 for arcuate adjustment of position of these switches. The peripheral margin of wheels 106 and 107 have holes 136. In some of these holes on wheels 106 and 107 are mounted dogs or cams 137. When wheel 106 is rotated from its home position for a complete revolution, each of cams 137 on wheel 106 will momentarily trip and close switch 4LS. Similarly with each single revolution of wheel 107, each of cams 137 on wheel 107 will momentarily trip and close switch 5LS.

Figure 3:
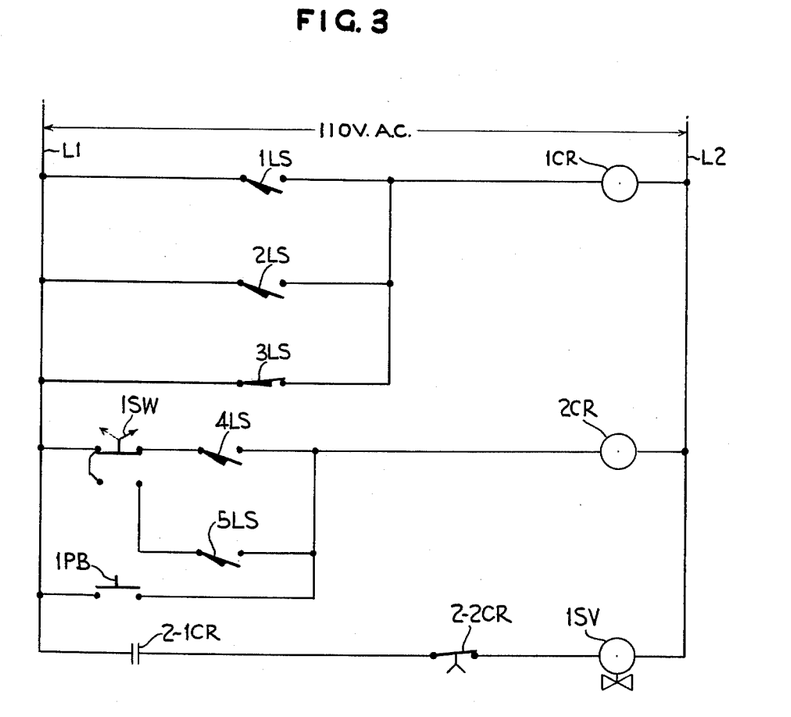
FIGS. 3 and 4 are schematic drawings of electrical circuitry used in the apparatus.

The number of cams 137 on wheel 106 will equal the number of score lines on a glass sheet to be snapped in sequence by the closings of switch 4LS. The positions of these cams 137 on wheel 106 is determined by the distances between the leading edge of glass sheet G and the score lines of sheet G. When another glass sheet having score lines that are in a different pattern of distances from the leading edge of the glass sheet is to be snapped, switch 5LS is used and the positions of cams 137 on wheel 107 is determined by these distances between the leading edge of this glass sheet and the score lines of this sheet. Thus the apparatus can be rapidly changed from the program of snapping of one glass sheet to a different program of snapping for another glass sheet that has a different pattern of score lines by rendering switch 4LS ineffective in the electrical circuitry and rendering switch 5LS effective through a 2-position selector switch (as shown in FIG. 3). In other words, to change from one program of snapping to a second program of snapping, it is not necessary to change the positions of cams 137 on wheel 106. Instead the wheel 107 and its cams 137 are utilized for the second program.

Referring to FIG. 3 electric lines L1 and L2 are connected to a 110-volt alternating current source (not shown). A coil 1CR of a relay is in series with normally open limit switch 1LS, normally open limit switch 2LS and normally closed limit switch 3LS. The three limit switches are in parallel with one another. Thus any one of the three limit switches can provide a circuit for coil 1CR between lines L1 and L2.

A coil 2CR of a time delay relay is in another circuit between lines L1 and L2. The normally open limit switches 4LS and 5LS are in parallel with each other and are in series with coil 2CR. The 2-position selector switch 1SW has one position in which selector switch 1SW connects limit switch 4LS to line L1 and in the other position selector switch 1SW connects limit switch 5LS to line L1. In FIG. 3 selector switch 1SW is in the position in which switch 4LS is connected to line L1. In parallel with switch 1SW and switches 3LS and 4LS and in series with coil 2CR is a normally open push-button switch 1PB.

The relay having coil 2CR has a normally open contact 2–1CR of the instantaneous type and a normally closed contact 2–2CR of the time opening type which, upon the energization of coil 2CR, opens after a delay. The contacts 2–1CR and 2–2CR are in a circuit in series with a solenoid 1SV so that it is normally deenergized and the valve has its spool positioned by the spring so that piston rod 96 of air cylinder 97 is retracted.

Figure 4:
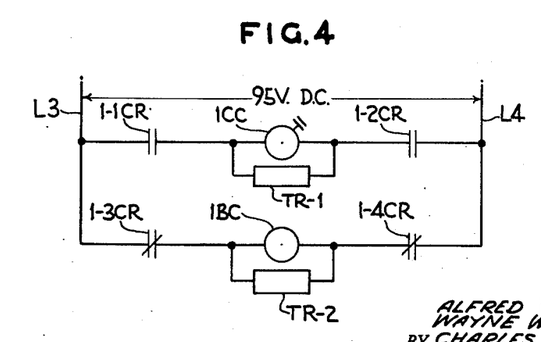

The relay having coil 1CR has two normally open contacts 1–1CR and 1–2CR and two normally closed contacts 1–3CR and 1–4CR. The contacts 1–1CR and 1–2CR are in series with coil 1CC of electric clutch 113. The contacts 1–1CR and 1–2CR and coil 1CC are in a circuit connected to lines L3 and L4 which are connected to a 95-volt direct current source (not shown). Another circuit, which is connected to line L3 and L4, contains in series contacts 1–3CR and 1–4CR and coil 1BC of electric brake 115. In parallel with coil 1CC and in series with contacts 1–1CR and 1–2CR is a thyratron resistor TR–1. Similarly a thyratron resistor TR–2 is in parallel with coil 1BC and in series with contacts 1–3CR and 1–4CR. The resistors TR–1 and TR–2 are present to protect contacts 1–1CR through 1–4CR when either coil 1CC or coil 1BC is deenergized.

When the leading edge of a glass sheet G trips either switch 1LS or switch 2LS to close it, coil 1CR is energized. This results in the closing of contacts 1–1CR and 1–2CR for the energization of coil 1CC to operate or engage electric clutch 113. At the same time contacts 1–3CR and 1–4CR open to deenergize coil 1BC to disengage electric brake 115. As a result shaft 108 starts its rotation to operate timing wheels 106 and 107.

In the home position of timing wheels 106 and 107, cam 133 maintained switch LS–3 open. Upon the initial rotation of shafts 108 and 110 and thus upon the initial rotation of cam 133 switch 3LS closes to maintain coil 1CR energized until after sheet G passes switches 1LS and 2LS.

When timing wheels 106 and 107 return to the home position, cam 133 opens switch 3LS. This results in the deenergization of coil 1CR to open contacts 1–1CR and 1–2CR for the deenergization of coil 1CC of electric clutch 113. This deenergization of coil 1CR results also in the closing of contacts 1–3CR and 1–4CR to energize coil 1BC of electric brake which stops rotation of shaft 108 at its home position as determined by cam 133.

With switch 1SW in the position shown in FIG. 3 each time one of cams 137 on timing wheel 106 trips switch 4LS the latter is closed to energize coil 2CR momentarily with switch 1SW in this position the tripping of switch 5LS by cams 137 on wheel 107 for the closing of switch 5LS for short periods of time does not provide energizations of coil 2CR. However, with switch 1SW in its other position the cams 137 on wheel 106 do not result in energizations of coil 2CR but each timing cam 137 on wheel 107 trips switch 5LS there is an energization of coil 2CR for a short period of time.

Each time coil 2CR is energized contact 2–1CR closes immediately so that coil 1SV is energized to lower roll 17. After a delay contact 2–2CR opens, thereby deenergizing coil 1SV before coil 2CR is deenergized, by the opening of switch 4LS or 5LS, to open contact 2–1CR.

At any time an operator wishes to operate air cylinder 97 he can close switch 1PB to energize coil 2CR so that coil 1SV is energized until contact 2–2CR opens.

*Operation*

A glass sheet G is passed by feeding conveyor 11 onto roll 14. The moving sheet G thus passes between rolls 13 and 14 and over roll 15. The rolls 13, 14 and 15 are rotating continuously. The receiving conveyor 16 is operating continuously. The roll 17 is in the raised position. The leading edge of sheet G trips and closes switches 1LS and 2LS. The closing of either switch 1LS or switch 2LS energizes coil 1CR to close contacts 1–1CR and 1–2CR for the energization of coil 1CC and to open contacts 1–3CR and 1–4CR for the deenergization of coil 1BC. The electric brake 115 disengages and the electric clutch 113 engages so that the continuous drive of sprocket 114 results in the rotation of shafts 108 and 110.

In this description of operation it is assumed that switch 1SW is in the position shown in FIG. 3. Thus each time that a cam 137 on wheel 106 trips switch 4LS, coil 2CR is energized to immediately close contact 2–1CR for the energization of coil 1SV. The air cylinder 97 operates to lower roll 17 sufficiently rapidly down onto the leading portion of sheet G to provide a bending force forwardly of the portion of sheet G supported by roll 15. At this moment the first score line is directly over roll 15. The rolls 13 and 14 hold down glass sheet G on that side of the score line. As a result the cut runs along this score line. The newly formed glass sheet G₁ has its front forward portion close to the top run of conveyor 16 and sheet G₁ falls completely onto belts 70 of conveyor 16.

As soon as the delay period of contact 2–2CR has run, it opens so that solenoid 1SV is deenergized and roll 17 is raised, even though switch 4LS might still be closed by cam 137. This completes the first cycle of the snapping operation.

The forward movement of the remaining portion of sheet G continues. When its next score line is directly above roll 15, a cam 137 on wheel 106, because of its predetermined positioning, trips switch 4LS to repeat the cycle of lowering and raising of roll 17 described above.

After the last score line in sheet G has been run by the lowering of roll 17 through the tripping of switch 4LS by the last cam 137 on wheel 106 in its single revolution, the drive of wheel 106 continues until cam 133 opens switch 3LS. Before this event sheet G has passed beyond switches 1LS and 2LS so that they are now open. With coil 1CR deenergized by the opening of switch 3LS contacts 1–1CR and 1–2CR open to deenergize coil 1CC and contacts 1–3CR and 1–4 CR close to energize coil 1BC. Thus electric clutch 113 disengages and electric brake 115 immediately stops shaft 108 so that it, shaft 110 and cam 133 are at their home positions. If the next glass sheet has a different pattern of distances of score lines from the leading edge and if this pattern of distances is represented by the positioning of cams 137 on wheel 107, an operator changes switch 1SW to the second position. However, if the next glass sheet has the same positioning of score lines as the sheet described above, switch 1SW is kept in the first position for the automatic snapping of the glass sheet along these score lines through the tripping of switch 4LS by cams 137 on wheel 106.

The pulleys 72 and belts 70 directly at the top portion of pulleys 72 constitute in effect a roll, which has a resilient covering, to receive glass sheets G₁ after they have been snapped by the lowering of roll 17. In other words, the belts 70 and pulleys 72 constitute means to support and to move glass sheets G₁ away from rolls 14 and 15. Instead of conveyor 16, which is preferred, a conveyor similar to conveyor 11 can be used to receive sheets G₁ and its first roll would replace pulleys 72.

Various modifications of the apparatus will be apparent to one skilled in the art from the description of the preferred embodiment presented above and in the drawings. Thus the invention is not to be limited by this description but only by the claims that follow.

We claim:

1. An apparatus for snapping a moving glass sheet to run a cut along a score line parallel to the leading edge of the sheet which comprises a supporting structure, conveyor means to move a glass sheet in a higher horizontal path of travel, an upper roll and a lower roll rotatably mounted on the supporting structure to receive the glass sheet from the conveyor means between said upper and lower rolls in the higher horizontal path, a third roll rotatably mounted on the supporting structure to receive the glass sheet passing between the upper and lower rolls in the higher horizontal path, means mounted on the supporting structure to support and to move a glass sheet in a direction away from said third and lower rolls and said conveyor means in a lower horizontal path of travel, a fourth roll rotatably mounted on the supporting structure above said support means for vertical movement from a first position wherein said fourth roll is spaced above the higher horizontal path and a second position wherein a portion of said fourth roll is below the higher horizontal path, actuated power means to move said fourth roll between the first position and the second position, sensing means mounted on the supporting structure in a position to be actuated by the leading edge of the glass sheet moving in the higher horizontal path of travel, actuating means responsive to the sensing means to actuate after a predetermined delay said power means to lower said fourth roll from the first position to the second position, and means responsive to the sensing means after a further delay to actuate said power means to raise the fourth roll from the second position to the first position.

2. The apparatus of claim 1 wherein said upper and lower rolls and said third and fourth rolls have resilient surfaces and wherein said upper roll is rotatably mounted to said supporting structure by a support means connected to said supporting structure for vertical adjustment of position of said upper roll.

3. The apparatus of claim 2 wherein a supporting structure includes for rotatably mounting said fourth roll for vertical movement a pair of bearings, each having a housing with grooves in its vertical sides, vertical guide plates engaging the grooves of the housings of said bearings and a rod connected to each housing of said bearings and wherein said power means to move said fourth roll between the first and second positions includes a shaft rotatably mounted on said supporting structure for movement about a horizontal axis of said shaft, pivot arms fixed on said shaft and connected to said rods, another pivot arm fixed on said shaft, and an air cylinder pivotally mounted on said supporting structure and having a piston rod pivotally connected to said another pivot arm.

4. An apparatus for snapping a moving glass sheet to run cuts in sequence along a number of parallel score lines on the glass sheet which are parallel to the leading edge of the sheet which comprises a supporting structure, conveyor means to move a glass sheet in a higher horizontal path of travel, an upper roll and a lower roll rotatably mounted on the supporting structure to receive the glass sheet from the conveyor means between the upper and the lower rolls in the higher horizontal path, a third roll rotatably mounted on the supporting structure to receive the glass sheet passing between the upper roll and the lower roll in the higher horizontal path, means mounted on the supporting structure to support and to move a glass sheet away from said third and lower rolls and said conveyor means in a lower horizontal path of travel, a fourth roll rotatably mounted on the supporting structure above said support means for vertical movement from a first position wherein said fourth roll is spaced above the higher horizontal path and a second position wherein a portion of said fourth roll is below the higher horizontal path, actuated power means to move said fourth roll between the first position and the second position, sensing means mounted on the supporting structure in a position to be actuated by the leading edge of the glass sheet moving in the higher horizontal path of travel, actuating means responsive to the sensing means to actuate after each of a predetermined number of delays said power means to lower said fourth roll from the first position to the second position, and means responsive to said actuating means to actuate said power means to raise said fourth roll from the second position to the first position shortly after each operation of said power means that lowers said fourth roll.

5. The apparatus of claim 4 wherein said apparatus includes means to rotate said upper and lower rolls and said third roll and wherein said sensing means is mounted to be actuated when the leading edge of the moving glass sheet is directly above the axis of rotation of said third roll.

6. An apparatus for snapping a moving glass sheet to run cuts in sequence along a number of parallel score lines in the glass sheet which are parallel to the leading edge of the sheet which comprises a supporting structure, conveyor means to move a glass sheet in a higher horizontal path of travel, an upper roll and a lower roll rotatably mounted on the supporting structure to receive the glass sheet from the conveyor means between the upper and lower rolls in the higher horizontal path, a third roll rotatably mounted on the supporting structure to receive a glass sheet passing between the upper roll and the lower roll in the higher horizontal path, means mounted on the supporting structure to support and to move a glass sheet away from said third and lower rolls and said conveyor means in a lower horizontal path of travel, a fourth roll rotatably mounted on the supporting structure above said support means for vertical movement from a first position wherein said fourth roll is spaced above the higher horizontal path and a second position wherein a portion of said fourth roll is below the higher horizontal path, actuated power means to move said fourth roll between the first position and the second position, sensing means mounted on the supporting structure in a position to be actuated by the leading edge of the glass sheet moving in the higher horizontal path of travel, a plate mounted for rotation about an axis, cams mounted on said plate in a circle concentric with said axis, actuated power means to rotate said plate about said axis, sensing means mounted to be actuated by the moving of each of said cams past a position during the rotation of said plate about said axis, actuating means responsive to actuation of said sensing means to actuate said power means to lower said fourth roll from the first position to the second position, and means responsive after a delay to each actuation of said sensing means to actuate said power means to raise the fourth roll from the second position ot the first position.

7. The apparatus of claim 6 wherein said sensing means is mounted to be actuated when the leading edge of the moving glass sheet is directly above the axis of rotation of said third roll.

8. An apparatus for snapping a moving glass sheet to run cuts in sequence along a number of parallel score lines on the glass sheet which are parallel to the leading edge of the sheet which comprises a supporting structure, conveyor means to move a glass sheet in a higher horizontal path of travel, an upper roll and a lower roll rotatably mounted on the supporting structure to receive the glass sheet from the conveyor means between the upper and the lower rolls in the higher horizontal path, a third roll rotatably mounted on the supporting structure to receive the glass sheet passing between the upper roll and the lower roll in the higher horizontal path, means mounted on the supporting structure to support and to move a glass sheet away from said third and lower rolls and said conveyor means in a lower horizontal path of travel, a fourth roll rotatably mounted on the supporting structure above said support means for vertical movement from a first position wherein said fourth roll is spaced above the higher horizontal path and a second position wherein a portion of said fourth roll is below the higher horizontal path, actuated power means to move said fourth roll between the first position and the second position, sensing means mounted on the supporting structure in a position to be actuated by the leading edge of the glass sheet moving in the higher horizontal path of travel, a wheel mounted for rotation from a home position about an axis, actuated motor means to rotate said wheel about said axis, cams mounted on said wheel about a circle concentric with said axis, a limit switch mounted to be tripped by said cams during rotation of said wheel, means responsive to tripping of said limit switch to actuate said power means for lowering said fourth roll from the first position to the second position, means responsive to tripping of said limit switch to actuate after a delay said power means for raising said fourth roll from the second position to the first position, means responsive to said sensing means to actuate said motor means, and means responsive to each single revolution of said wheel to deactuate motor means and to stop rotation of said wheel at said home position.

9. The apparatus of claim 8 wherein said sensing means is mounted to be actuated when the leading edge of the moving glass sheet is directly above the axis of rotation of said third roll.

10. An apparatus for snapping a moving glass sheet to run cuts in sequence along a number of parallel score lines on the glass sheet which are parallel to the leading edge of the sheet which comprises a supporting structure, conveyor means to move a glass sheet in a higher horizontal path of travel, an upper roll and a lower roll rotatably mounted on the supporting structure to receive the glass sheet from the conveyor means between the upper and the lower rolls in the higher horizontal path, a third roll rotatably mounted on the supporting structure to receive the glass sheet passing between the upper roll and the lower roll in the higher horizontal path, means mounted on the supporting structure to support and to move a glass sheet away from said third and lower rolls and said conveyor means in a lower horizontal path of travel, a fourth roll rotatably mounted on the supporting structure above said support means for vetrical movement from a first position wherein said fourth roll is spaced above the higher horizontal path and a second position wherein a portion of said fourth roll is below the higher horizontal path, actuated power means to move said fourth roll between the first position and the second position, sensing means mounted on the supporting structure in a position to be actuated by the leading edge of the glass sheet moving in the higher horizontal path of travel, a pair of wheels each mounted for rotation from a home position about an axis, actuated motor means to rotate said wheels about said axes, cams mounted on each of said wheels each about a circle concentric with each of said axes, a pair of limit switches mounted to be tripped by said cams during rotation of said wheels, means responsive selectively to tripping one of said limit switches to actuate said power means for lowering said fourth roll from the first position to the second position, means responsive selectively to tripping of said one of said limit switches to actuate after a delay said power means for raising said fourth roll from the second position to the first position, said selectively responsive means including a selector switch, means responsive to said sensing means to actuate said motor means, and means responsive to each single revolution of said wheel to deactuate motor means and to stop rotation of said wheel at said home position.

11. An apparatus for snapping a moving glass sheet to run cuts in sequence along a number of parallel score lines on the glass sheet which are parallel to the leading edge of the sheet which comprises a supporting structure, conveyor means to move a glass sheet in a higher horizontal path of travel, an upper roll and a lower roll rotatably mounted on the supporting structure to receive the glass sheet from the conveyor means between the upper and the lower rolls in the higher horizontal path, a third roll rotatably mounted on the supporting structure to receive the glass sheet passing between the upper roll and the lower roll in the higher horizontal path, means mounted on the supporting structure to support and to move a glass sheet away from said third and lower rolls and said conveyor means in a lower horizontal path of travel, a fourth roll rotatably mounted on the supporting structure above said support means for vertical movement from a first position wherein said fourth roll is spaced above the higher horizontal path and a second position wherein a portion of said fourth roll is below the higher horizontal path, actuated power means to move said fourth roll between the first position and the second position, sensing means mounted on the supporting structure in a position to be actuated by the leading edge of the glass sheet moving in the higher horizontal path of travel, a shaft rotatably mounted on said supporting structure, actuated motor means to rotate said shaft, a wheel keyed on said shaft, cams mounted on said wheel about a circle concentric with an axis of rotation of said shaft, a limit switch mounted on said supporting structure to be tripped by said cams during rotation of said shaft, means responsive to the tripping of said limit switch to actuate said power means for lowering said fourth roll from the first position to the second position, means responsive to tripping of said limit switch to actuate after a delay said power means for raising said fourth roll from the second position to the first position, another cam mounted on said supporting structure for rotation from a home position about an axis through said another cam, means operative with rotation of said shaft to rotate said another cam, a second limit switch mounted on said supporting structure to be tripped by said another cam at its home position, means responsive to said sensing means and to said second limit switch when tripped by said another cam whereby said motor means rotates said shaft when said first means is actuated by the glass sheet and thereafter until said another cam trips said second limit switch, and means responsive to tripping of said second limit switch to deactuate said motor means.

12. The apparatus of claim 11 wherein said apparatus includes means to rotate said upper and lower rolls and said third roll and wherein said sensing means is mounted to be actuated when the leading edge of the moving glass sheet is directly above the axis of rotation of said third roll.

13. The apparatus of claim 12 wherein the power means for raising and lowering said fourth roll includes an air cylinder, wherein the means responsive to the tripping of said first-mentioned limit switch to actuate said power means for lowering said fourth roll includes a relay having a coil in series with said first-mentioned limit switch and a normally open contact of said relay, and a solenoid, said first-mentioned limit switch being in an electrical circuit in series with said coil to energize said coil when said first-mentioned limit switch is tripped, said solenoid being in series in an electrical circuit with said contact of said relay whereby said solenoid is energized during the tripping of said first-mentioned limit switch, and wherein the means responsive to tripping of said first-mentioned limit switch to actuate after a delay said power means includes a normally closed, time-opening contact of said relay in series with said solenoid in said electrical circuit.

14. The apparatus of claim 13 wherein said sensing means includes a second normally open limit switch closed by the glass sheet, wherein said means responsive to said sensing means and to said another limit switch includes another relay having a coil and a third normally open contact and a normally closed contact, said coil being in an electrical circuit with said limit switch of said sensing means and in an electrical circuit with said another limit switch which is normally closed but opened by said another cam in its home position, whereby the sheet energizes said coil of said another relay and said another limit switch maintains energization of said coil of said another relay until said another cam is rotated to its home position, wherein said motor means includes an electric clutch having a coil in an electrical circuit with said second normally open contact to be energized by energization of said coil of said another relay, and wherein said apparatus includes an electric brake having a coil in an electrical circuit with said normally closed contact to operate said electric brake to stop rotation of said shaft, on which said wheel is mounted, by deenergization of said coil of said another relay upon opening of said second limit switch.

15. An apparatus for snapping a moving glass sheet to run cuts in sequence along a number of parallel score lines on the glass sheet which are parallel to the leading edge of the sheet which comprises a supporting structure, conveyor means to move a glass sheet in a higher horizontal path of travel, an upper roll and a lower roll rotatably mounted on the supporting structure to receive the glass sheet from the conveyor means between the upper and the lower rolls in the higher horizontal path, a third roll rotatably mounted on the supporting structure to receive the glass sheet passing between the upper roll and the lower roll in the higher horizontal path, means mounted on the supporting structure to support and to move a glass sheet away from said third and lower rolls and said conveyor means in a lower horizontal path of travel, a fourth roll rotatably mounted on the supporting structure above said support means for vertical movement from a first position wherein said fourth roll is spaced above the higher horizontal path and a second position wherein a portion of said fourth roll is below the higher horizontal path, actuated power means to move said fourth roll between the first position and the second position, sensing means mounted on the supporting structure in a position to be actuated by the leading edge of the glass sheet moving in the higher horizontal path of travel, a pair of shafts rotatably mounted on said supporting structure, actuated motor means to rotate both of said shafts, a wheel keyed on each of said shafts, cams mounted on each of said wheels each about a circle concentric with axes of rotation of said shafts, a pair of limit switches mounted on said supporting structure to be tripped by said cams on said wheels during rotation of said shafts, means responsive selectively to the tripping of one of said limit switches to actuate said power means for lowering said fourth roll from the first position to the second position, means responsive selectively to tripping of said one of said limit switches to actuate after a delay said power means for raising said fourth roll from the second position to the first position, said selectively responsive means including a selector switch, another cam mounted on said supporting structure for rotation from a home position about an axis through said another cam, means operative with rotation of one of said shafts to rotate said another cam, another limit switch mounted on said supporting structure to be tripped by said another cam at its home position, means responsive to said sensing means and to said another limit switch when tripped by said another cam whereby said motor means rotates said shafts when said sensing means is actuated by the glass sheet and thereafter until said another cam trips said second limit switch, and means responsive to tripping of said other limit switch to deactuate said motor means.

References Cited in the file of this patent

UNITED STATES PATENTS

| | | |
|---|---|---|
| 2,042,819 | Allison | June 2, 1936 |
| 2,559,366 | Morris | July 3, 1951 |
| 2,756,545 | Atkeson | July 31, 1956 |
| 2,948,991 | Walters et al. | Aug. 16, 1960 |

FOREIGN PATENTS

| | | |
|---|---|---|
| 807,830 | Great Britain | Jan. 21, 1959 |

UNITED STATES PATENT OFFICE

CERTIFICATE OF CORRECTION

Patent No. 3,072,308  January 8, 1963

Alfred C. Oakes et al.

It is hereby certified that error appears in the above numbered patent requiring correction and that the said Letters Patent should read as corrected below.

Column 7, lines 5 and 6, after "momentarily" insert a period; line 6, for "with" read -- With --; column 9, line 74, for "ot" read -- to --; column 10, line 63, for "vetrical" read -- vertical --.

Signed and sealed this 9th day of June 1964.

(SEAL)
Attest:

ERNEST W. SWIDER
Attesting Officer

EDWARD J. BRENNER
Commissioner of Patents